United States Patent [19]

Amelio

[11] Patent Number: 5,433,070
[45] Date of Patent: Jul. 18, 1995

[54] FLEXIBLE ENGINE INLET DUCT MOUNTING SYSTEM

[75] Inventor: Armand F. Amelio, New Milford, Conn.

[73] Assignee: United Technologies Corporation, Hartford, Conn.

[21] Appl. No.: 118,064

[22] Filed: Sep. 8, 1993

[51] Int. Cl.$^6$ ............................................... F02C 7/20
[52] U.S. Cl. ..................... 60/39.31; 60/39.092; 244/53 B; 137/151
[58] Field of Search ............... 60/39.31, 39.32, 39.092; 244/53 B; 137/15.1, 15.2

[56] References Cited

U.S. PATENT DOCUMENTS

2,932,945  4/1960  Brandt ............................. 244/53 B

*Primary Examiner*—Richard A. Bertsch
*Assistant Examiner*—William Wicker
*Attorney, Agent, or Firm*—Terrançe J. Radke

[57] ABSTRACT

A flexible engine inlet duct mounting system for integrating an engine inlet duct in combination with an engine system to minimize or eliminate turbulence-inducing structural discontinuities therebetween wherein non-turbulent intake airflow is provided to the engine system. The mounting system includes a mechanical support assembly that constrains the relative motion between the aft ends of the inlet duct and the engine system, and a dual seal assembly that accommodates such relative motion while concomitantly maintaining seals between the inlet duct and the engine system. The duct support assembly includes an annular duct support member and an annular spherical adaptor member having interacting ends that have complementary arcuate configurations which constrain the relative motion of the aft ends of the inlet duct to in-plane displacements about a duct pivot point coincident with the engine system centerline.

15 Claims, 4 Drawing Sheets

FLEXIBLE ENGINE INLET DUCT MOUNTING SYSTEM

The Government has rights in this invention pursuant to Contract No. DAAJ09-91-C-A004 awarded by the Department of the Army.

TECHNICAL FIELD

The present invention relates to engine systems, and more particularly, to a flexible engine inlet duct mounting system for helicopter engine systems that accommodates manufacturing deviations in the engine inlet duct and which furthermore accommodates relative motion between the engine inlet duct and the engine system.

BACKGROUND OF THE INVENTION

Helicopter gas turbine engine systems mix ambient air with fuel to provide a combustible energy source for the gas turbine engine systems. Such engine systems perform more efficiently if the ambient air is provided under non-turbulent flow conditions. This is typically achieved by channeling ambient air into the forward portion of the engine system through an engine inlet duct that is configured to maintain the intake airflow in a non-turbulent condition. Turbulence may be induced in the intake airflow, however, due to structural discontinuities at the attachment or integration zones of the engine inlet duct.

For externally mounted engine systems, for example, the aft end of the engine inlet duct is integrated in combination with the engine system and the forward end of the engine inlet duct is directly exposed to the flight environment to channel ambient air into the engine system via the engine inlet duct. For internally mounted engine systems, in contrast, the aft end of the engine inlet duct is integrated in combination with the engine system internally within the airframe of the aircraft and the forward end of the engine inlet duct is generally integrated in combination with the airframe. Ambient airflow over the airframe is diverted to the engine by means of the engine inlet duct.

Structural discontinuities may occur at the forward and/or aft integration zones which will induce turbulence in the intake airflow. Such structural discontinuities may arise as a result of manufacturing variations in the fabrication of the engine inlet duct which may cause structural discontinuities when the engine inlet duct is integrated in combination with the engine system and/or airframe. In addition, aperiodic transient structural discontinuities may occur as a result of relative motion between the engine inlet duct and the engine system during helicopter operations.

Since the engine inlet duct for internally mounted engines is effectively fixed at both the forward and aft ends thereof and is enclosed within the airframe, the fabrication of internal engine inlet ducts requires close manufacturing tolerances to ensure proper integration of the engine inlet duct with the airframe and the engine system, i.e., to preclude any structural discontinuities. In addition, structural discontinuities may arise as a result of relative motion between the engine inlet system and the engine system. Such structural discontinuities may be especially problematical in helicopters where the engine system is structurally and functionally interconnected with the main transmission gearbox and subject to deflections induced by the main transmission gearbox. Such deflections are a result of the torque loads of the gearbox and/or applied loads due to aircraft flight maneuvers.

Out-of-tolerance inlet engine duct structures, which preclude proper integration, and/or relative motion between the engine inlet duct and the engine system due to induced deflections, may cause structural discontinuities at the integration zone of the engine inlet duct and the engine system. Such structural discontinuities create turbulence in the channeled intake airflow provided to the engine system by means of the engine inlet duct. The operation of the engine system may be adversely affected to varying degrees depending upon the magnitude of the turbulence induced in the intake airflow in the engine inlet duct due to such structural discontinuities. For example, highly turbulent intake airflow causes the compressor of gas turbine engine systems to effectively "see" shock waves which cause compressor stall.

A need exists to provide a flexible engine inlet duct mounting system for helicopter engine systems that accommodates manufacturing deviations in the engine inlet duct wherein the engine inlet duct may be properly integrated in combination with the helicopter airframe and the engine system so that structural discontinuities are eliminated. In addition, the mounting system should accommodate transient, aperiodic relative motion between the helicopter airframe, the main transmission gearbox, and the internal engine system without causing turbulence-inducing structural discontinuities at the integration zone between the engine inlet duct and the engine system.

SUMMARY OF THE INVENTION

One object of the present invention is to provide a flexible engine inlet duct mounting system for a helicopter engine system that accommodates relative motion between the engine inlet duct and the engine system without causing turbulence-inducing structural discontinuities at the integration zone between the engine inlet duct and the engine system wherein non-turbulent intake airflow is provided to the engine system.

Another object of the present invention is to provide a flexible engine inlet duct mounting system that accommodates manufacturing variations in the engine inlet duct configuration wherein such engine inlet ducts may be properly integrated in combination with the engine system.

A further object of the present invention is to provide a flexible engine inlet duct mounting system that constrains the relative motion between the engine inlet duct and the engine system to in-plane displacements of the aft ends of the engine inlet duct with respect to the engine system.

Yet another object of the present invention is to provide a flexible engine inlet duct mounting system that includes sealing means that accommodates in-plane displacements of the aft ends of the engine inlet duct with respect to the engine system while concomitantly maintaining sealing therebetween.

These and other objects of the present invention are provided by a flexible engine inlet duct mounting system that includes support means comprising an annular spherical adaptor member having first and second ends and an annular duct support member having first and second ends which in interactive combination constrain the relative motion between the aft ends of the engine inlet duct and the engine system. The first ends of the adaptor member and the support member are secured in combination with the engine system and the aft end of the engine inlet duct, respectively. The second ends of the adaptor member and the support member have complementary arcuate configurations and are disposed in a bearing relationship with one another. Deflections of the engine system are coupled through the second ends to cause in-plane displacements of the aft ends of the engine inlet duct. The structural configurations, attachments, and interactions of the annular spherical adaptor member and duct support member effectively cause the aft ends of the engine inlet duct to pivot about a duct pivot point that coincides the engine system centerline.

The mounting system further includes a dual seal configuration comprising outer and inner sealing assemblies that maintain seals between the engine inlet duct and the engine system. The inner and outer sealing assemblies are configured to accommodate the in-plane displacements of the aft ends of the engine inlet duct while maintaining fluid seals between the aft ends and the engine system.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
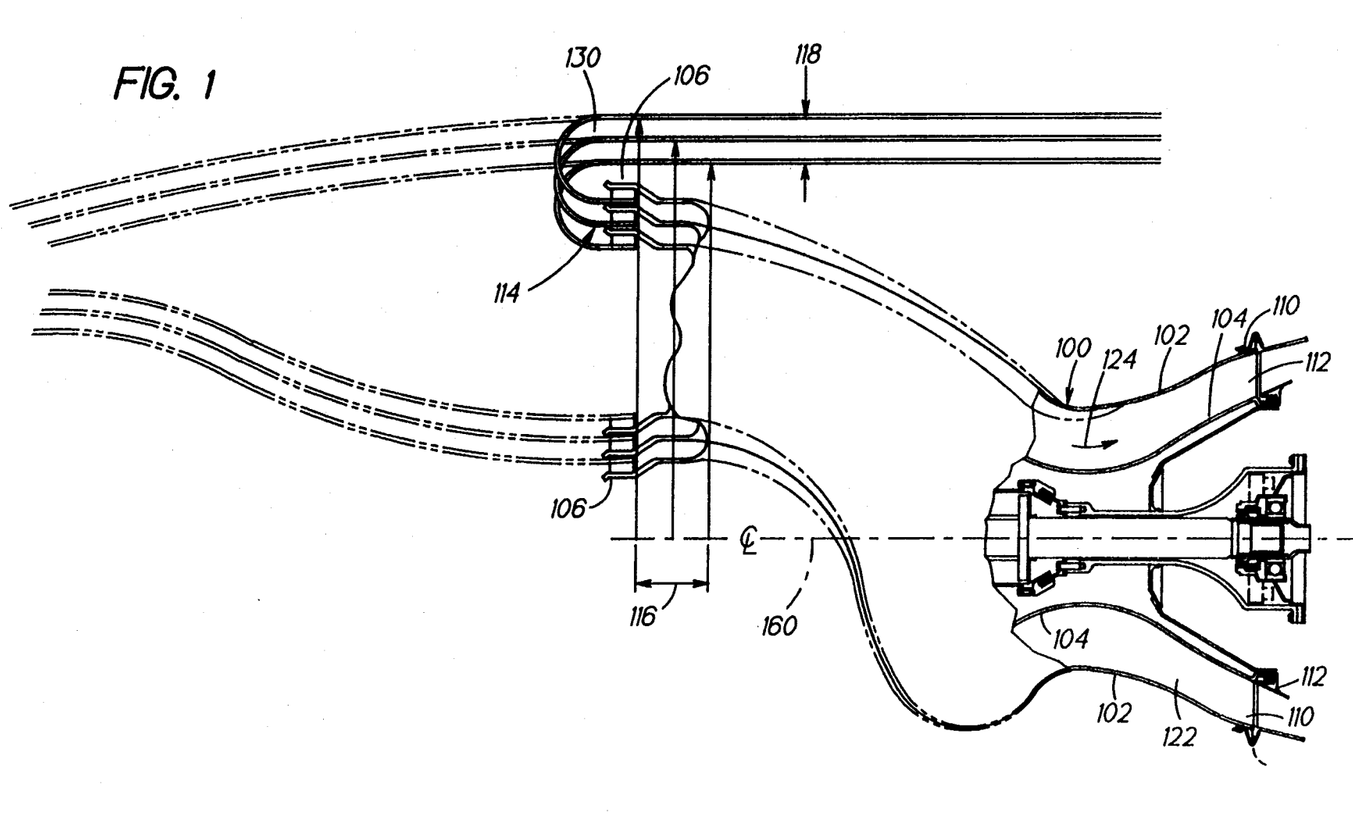
FIG. 1 is a partial cross-sectional view illustrating the forward end integration of an internal engine inlet duct with an airframe.

Referring now to the drawings wherein like reference characters identify corresponding or similar elements throughout the several views, FIG. 1 illustrates the integration of the forward end of an internal engine inlet duct 100 with an exemplary helicopter airframe 130. The engine inlet duct 100 comprises an outer wall 102 having forward and aft ends 106, 110, respectively, and an inner wall 104 having an aft end 112 (the forward end of inner wall 104, which is not illustrated in FIG. 1, terminates at the radial location of the forward end 106 of the outer wall 102). The outer and inner walls 102, 104 define an annular airflow channel 122 for channeling intake airflow 124 to the engine system (see also FIGS. 2, 3). The forward end 106 of the duct wall 102 is rigidly affixed to the airframe 130 by mechanical means 114 (inner wall 104 is similarly affixed). Conventional mechanical devices and affixment techniques are utilized for this purpose. The affixment of the forward ends of the outer and inner duct walls to the airframe does not comprise part of the present invention, and is described herein only to facilitate a more complete understanding of the present invention.

As illustrated in FIG. 1 by dashed lines 116, 118, the airframe 130 at the forward end integration zone can accommodate plus/minus deflections from the normal in the horizontal and/or vertical directions, respectively. For the RAH-66 Comanche helicopter, horizontal and vertical deflections of airframe of about ±0.64 cm (±$\frac{1}{4}$ inch) represent a pragmatic design criterion. Such deflections are effectively damped over the length of the engine inlet duct 100 and do not adversely affect the integration zone for the aft ends 110, 112 of the engine inlet duct 100.

Figure 2:
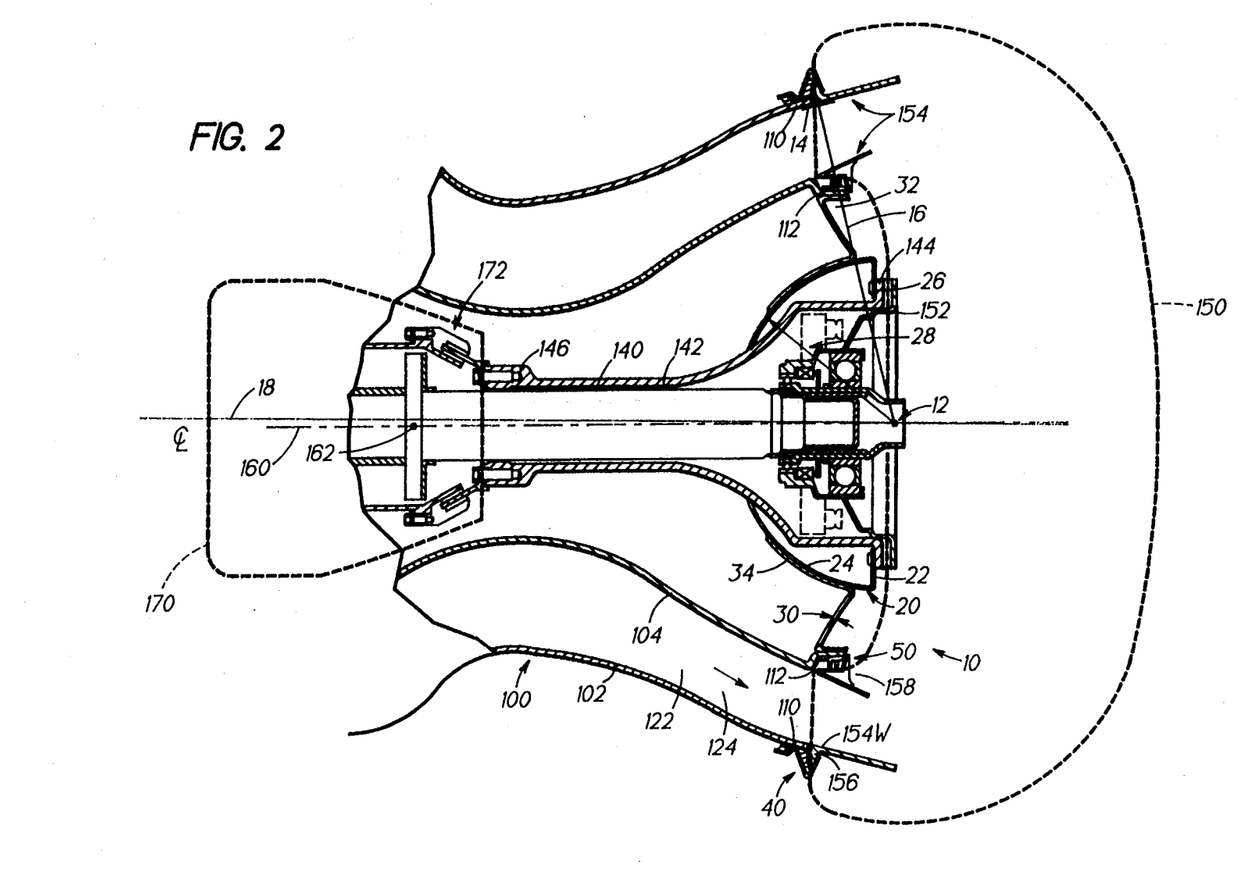
FIG. 2 illustrates a first embodiment of a flexible engine inlet duct mounting system according to the present invention.
Figure 3:
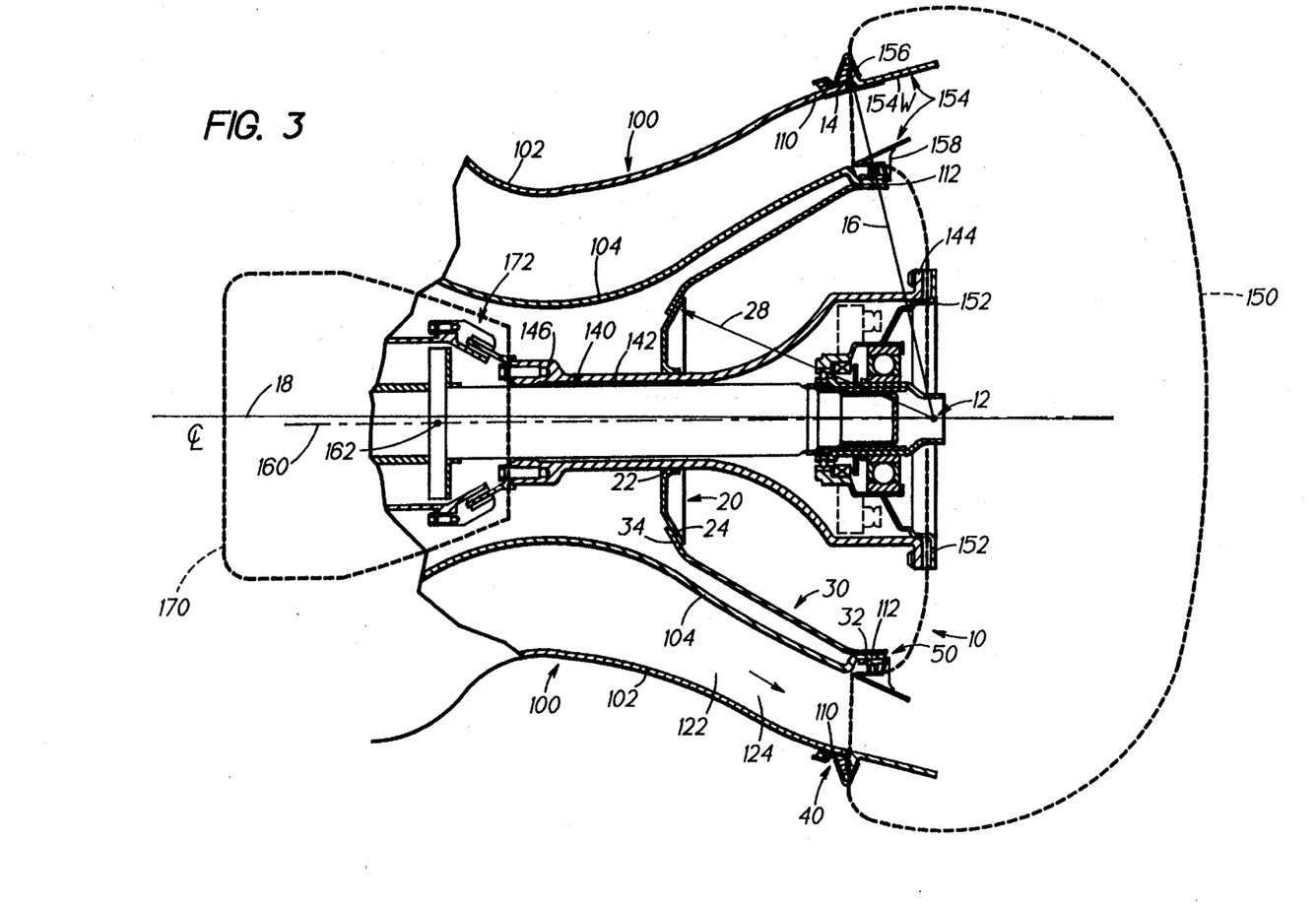
FIG. 3 illustrates a second embodiment of a flexible engine inlet duct mounting system according to the present invention.

FIG. 2 illustrates a first embodiment of a flexible engine inlet duct mounting system 10 and FIG. 3 illustrates a second embodiment of a flexible engine inlet duct mounting system 10. The flexible engine inlet duct mounting system 10 according to the present invention is operative to accommodate relative motion between the engine inlet duct 100 and the engine system while concomitantly precluding (or minimizing) turbulence-inducing structural discontinuities at the integration zone between the engine inlet duct 100 and the engine system. As described hereinbelow in further detail, the mounting system 10 for the aft integration zone includes a duct support means that controls the motion of the aft ends 110, 112 of the internal engine inlet duct 100 with respect to the engine system. In particular, the support means effectively constrains the motion of the aft ends 110, 112 to in-plane displacements, i.e., no (or minimal) out-of-plane movement of the aft ends 110, 112, with respect to the engine system. The mounting system 10 further includes sealing means that facilitates such relative in-plane displacements between the aft ends 110, 112 of the internal engine inlet duct 100 and the engine system. The sealing means accommodates such in-plane displacements while concomitantly maintaining a tight seal between the aft ends 110, 112 of the inlet duct 100 and the engine system.

To more fully appreciate the structural and functional features and advantages provided by the flexible engine inlet duct mounting system 10 of the present invention, a brief discussion of the structural features and functional interactions of a helicopter engine system and main transmission gearbox are presented in the following paragraphs. With reference to FIGS. 2, 3, a torque shaft 140 mechanically interconnects an engine system 150 to a main transmission gearbox 170 and functions to couple the torque developed by the engine system 150 to the main transmission gearbox 170 to rotate a rotor assembly (not illustrated). The engine system 150 and the main transmission gearbox 170 are illustrated by dashed lines in FIGS. 2, 3 for purposes of simplification. The engine system 150 is also structurally interconnected to the main transmission gearbox 170 by a support tube 142 that envelopes the torque shaft 140. A first end 144 of the support tube 142 is rigidly interfaced, e.g., bolted connection, with a forward engine support member 152 of the engine system 150, and the second end 146 of the support tube 142 is mechanically interconnected to the main transmission gearbox 170 by means of a flexible coupling 172.

The engine system 150 also includes an integral port 154 that is mechanically interfaced with the engine inlet duct 100 to channel the intake airflow 124 from the inlet duct 100 to the engine system 150. The engine port 154 illustrated in FIGS. 2, 3 includes an outer annular flange 156 and an inner slip joint 158 that are disposed in combination with the aft ends 110, 112 of the outer and inner walls 102, 104 forming the engine inlet duct 100, as described hereinbelow in further detail. Reference numeral 160 defines the centerline of the engine system 150, and reference numeral 162 defines a pivot point between the engine system 150 and the main transmission gearbox 170 that is discussed hereinbelow.

The support means of the engine inlet duct mounting system 10 according to the present invention comprises an annular spherical adaptor member 20 having first and second ends 22, 24, respectively, and an annular duct support member 30 having first and second ends 32, 34, respectively. The adaptor member 20 and the support member 30 interact to effectively constrain the displacement of the aft ends 110, 112 of the inlet duct 100 to in-plane displacements.

The first end 22 of the annular spherical adaptor member 20 is rigidly interfaced with the engine system 150. With reference to FIG. 2, the rigid interface is exemplarily accomplished be means of bolted flange connections 26 that secure the first end 22 of the adaptor member 20, the first end 144 of the support tube 142, and the front engine support member 152 of the engine system 150 in combination. With reference to FIG. 3, the rigid interface is accomplished by securing the first end 22 of the adaptor member 20 in combination with the body of the support tube 142 by a conventional technique, e.g., welding, bolted connections. For purposes of the present invention, the support tube 142 is considered a structural element of the engine system 150.

The second end 24 of the annular spherical adaptor member 20 has an arcuate configuration having a predetermined radius of curvature 28. The predetermined radius of curvature 28 is defined with respect to a duct pivot point 12 that coincides with the engine centerline 160. The duct pivot point 12, in turn, is defined by the interface between the aft end 110 of internal engine inlet duct 100 and the corresponding wall 154W of the engine port 154.

More specifically, the flexible engine inlet duct mounting system 10 according to the present invention is operative, inter alia, to constrain relative motion between the aft end 110 of the engine inlet duct 100 and the corresponding wall 154W of the engine port 154 to in-plane displacements. This result is achieved by the arcuate configuration of the second end 24 of the annular spherical adaptor member 20. A line 14 is drawn tangent to the aft end 110 of the outer wall 102 and the engine port wall 154W in the neutral position (the design point for the engine inlet duct 100). The duct pivot point 12 is defined by the intersection of a line 16 orthogonal to the tangent line 14 (at the juncture between the aft end 110 of the outer wall 102 and the engine port wall 154W) with the engine centerline 160.

The first end 32 of the annular duct support member 30 is rigidly secured to the aft end 112 of the inner wall 104 of the internal engine inlet duct 100 by a conventional technique, e.g., welding, bolted connections. The second end 34 of the annular duct support member 30 has a configuration that is complementary to the arcuate configuration of the second end 24 of the spherical adaptor member 20. The second end 34 continually bears against the second end 24 of the adaptor member 20, i.e., the second end 34 is constantly in frictional sliding engagement with the second end 24. The sliding frictional engagement between the second ends 24, 34 may be facilitated by modifying either one or both of the second ends 24, 34 to reduce the coefficient of sliding friction therebetween, e.g., by means of a teflon or metallic coating.

The main transmission gearbox 170 is configured to accommodate deflections due to engine torque and/or applied maneuver loads that occur during helicopter operations. Such deflections are coupled into the engine system 150 due to the structural interconnections between the engine system 150 and the main transmission gearbox 170 described hereinabove. The net effect of such deflections is that the engine system 150 may be considered to be subjected to pivotal movement with respect to the engine pivot point 162. These effective pivotal motions cause corresponding deflections of the second end 24 of the annular spherical adaptor member 20. Effectively, the second end 24 of the adaptor member 20 experiences pivotal motion about the duct pivot point 12 (see reference numeral 18 in FIGS. 2, 3).

Displacements induced in the second end 24 are coupled into the second end 34 of the annular duct support member 30 as a result of the bearing relationship between the second ends 24, 34. Due to the complementary arcuate configurations of the second ends 24, 34, the second end 34 of the duct support member 30 experiences sliding displacement in response to displacements of the second end 24 of the spherical adaptor member 20. The sliding displacement of the second end 34 is coupled through the first end 32 of the annular duct support member 30 to the aft ends 110, 112 of the engine inlet duct 100.

As a result of the bearing relationship between and the predetermined complementary arcuate configurations of the abutting second ends 24, 34 of the adaptor member 20 and the annular duct support member 30, the displacements induced in the aft ends 110, 112 of the engine inlet duct 100 are constrained to substantially in-plane translational movements. That is, the aft ends 110, 112 of the engine inlet duct 100 effectively pivot with respect to the duct pivot point 12. The magnitude of the induced displacements is generally such that the degree of such pivotal motion is small (on the order of a few degrees at most as illustrated by reference numeral 18 in FIGS. 2, 3) such that the aft ends 110, 112 effectively translate along or substantially parallel to (for aft end 110) the tangent line 14 in one direction or the other.

The sealing means of the flexible engine inlet duct mounting system 10 accommodates such substantially in-plane displacements of the aft ends 110, 112 of the engine inlet duct 100. The sealing means for the embodiments of the mounting system 10 described herein is a dual seal configuration that may comprise an outer sealing assembly 40 or 40' for the aft end 110 of the outer wall 102 and an inner sealing assembly 50 for the aft end 112 of the inner wall 104.

Figure 4A:
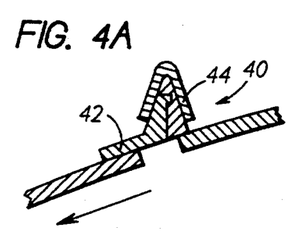
FIGS. 4A-4C illustrate one embodiment of an outer seal assembly for the flexible engine inlet duct mounting system according to the present invention.
Figure 4B:
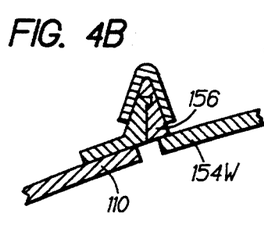
Figure 4C:
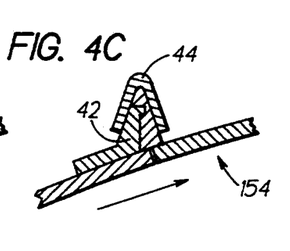

With reference to FIGS. 2, 4A–4C, the outer sealing assembly 40 illustrated in the first embodiment of the flexible engine inlet duct mounting system 10 comprises an annular (spherical) sliding seal 42 and an annular V-band clamp 44. The spherical sliding seal 42 is precision machined to have a configuration complementary to the outer annular flange 156 of the engine port 154 so that the spherical sliding seal 42 is mechanically interlockable therewith. The V-band clamp 44, which provides a strong, lightweight means of attaching large diameter members in combination and which facilitates servicing, is disposed in combination with the spherical sliding seal 42 and the outer annular flange 156 to mechanically interlock the spherical sliding seal 42 and flange 156 in combination. During substantially in-plane displacements of the aft end 110 of the engine inlet duct 100 with respect to the engine port wall 154W, the spherical sliding seal 42 slides relative to the aft end 110 while concomitantly maintaining a seal with respect thereto as illustrated in FIGS. 4A–4C.

With reference to FIGS. 3, 4D–4F, the outer sealing assembly 40' illustrated in the second embodiment of the flexible engine inlet duct mounting system 10 comprises an annular duct mounting member 46, an annular resilient sealing member 48, and the annular V-band clamp 44. The annular duct mounting member 46 and the annular resilient sealing member 48 in combination are functionally equivalent to the spherical sliding seal 42.

Figures 4D, 4E:
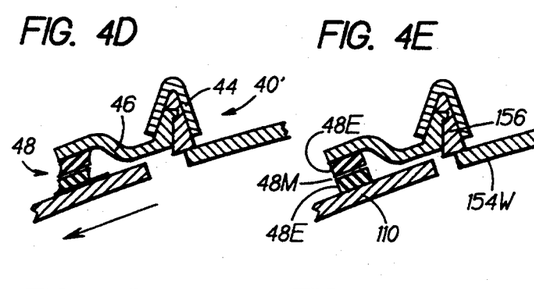
FIGS. 4D-4F illustrate another embodiment of an outer seal assembly for the flexible engine inlet duct mounting system according to the present invention.
Figure 4F:
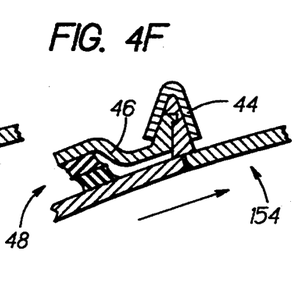

The annular duct mounting member 46 has a configuration complementary to the outer annular flange 156 so that the duct mounting member 46 is mechanically interlockable therewith. The resilient sealing member 48 is bonded to the duct mounting member 46 and the aft end 110 of the engine inlet duct 100. The V-band clamp 44 is disposed in combination with the annular duct mounting member 46 and the outer annular flange 156 to maintain the mechanical interlock therebetween. The resilient sealing member 48 elastically deforms during in-plane displacements of the aft end 110 of the engine inlet duct 100 with respect to the engine port wall 154W while concomitantly maintaining a seal therebetween as illustrated in FIGS. 4D–4F.

The annular resilient sealing member 48 is preferably formed from multiple rings of elastomer and metal. FIGS. 4D–4F illustrate one such embodiment of the resilient sealing member 48 comprising inner and outer rings 48E of elastomer having a metallic ring 48M interposed therebetween. Other embodiments of the annular resilient seal member 48 having more than two elastomer rings and more than a single metallic ring may also be utilized for the outer sealing assembly 40'. The embodiments of the annular resilient sealing member 48 comprising elastomeric rings 48E and interposed metallic ring(s) 48M provide enhanced radial stiffness for the outer sealing assembly 40'. One skilled in the art will appreciate that the annular resilient sealing member 48 may also be formed from a single solid ring of elastomer (embodiment not illustrated).

The flexible engine inlet duct mounting system 10 according to the present invention may utilize one of the outer sealing assemblies 40, 40' described hereinabove. The type utilized depends primarily on the operating environment generated by the engine system 150.

The inner sealing assembly 50 for the embodiments of the flexible engine inlet duct mounting system 10 described herein is illustrated in FIGS. 5A–5C and 5D–5F and comprises an elastomeric labyrinth seal 52 having one or more teeth 54 that is secured in combination, e.g., bonding, with the aft end 112 of the inner duct wall 104. The teeth 54 of the labyrinth seal 52 abut against and slide relative to the inner slip joint 158 of the engine port 154 to maintain a seal therebetween. The illustrated embodiment comprises two teeth 54, but one skilled in the art will understand that a labyrinth seal 52 having a single tooth or more than two teeth may also be utilized for the inner sealing assembly 50 of the flexible engine inlet duct mounting system 10. Generally, more teeth 54 provide a better seal.

Figure 5A:
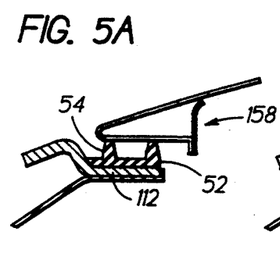
FIGS. 5A-5C are complementary illustrations of an embodiment of an inner seal assembly for the flexible engine inlet duct mounting system according to the present invention as used in combination with the outer seal assembly of FIGS. 4A-4C.
Figure 5B:
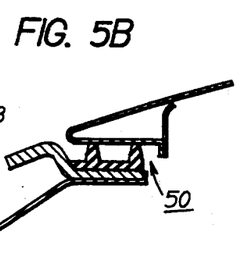
Figure 5C:
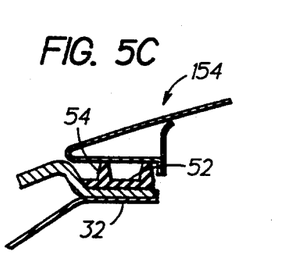
Figure 5D:
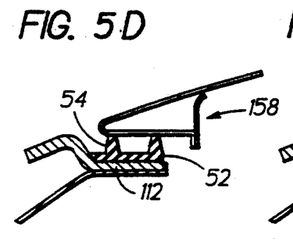
FIGS. 5D-5F are complementary illustrations of an embodiment of an inner seal assembly for the flexible engine inlet duct mounting system according to the present invention as used in combination with the outer seal assembly of FIGS. 4D-4F.
Figure 5E:
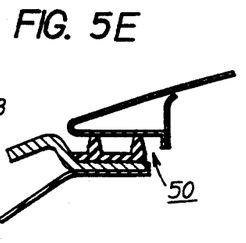
Figure 5F:
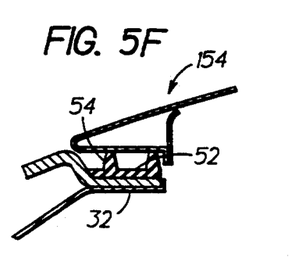

FIGS. 4B, and 5B, and 4E and 5E, respectively depict the neutral position for the outer and inner seal assemblies 40 or 40', 50 of the flexible engine inlet duct mounting system 10 according to the present invention. As described hereinabove, the duct pivot point 12 is defined with respect the neutral position, which in turn defines the arcuate configurations of the second ends 24, 34 of the spherical adaptor member 20 and the duct support member 30, respectively. The flexible engine inlet duct mounting system 10 according to the present invention constrains the aft ends 110, 112 of the engine inlet duct 100 to pivotal motion about the duct pivot point 12 such that the aft ends 110, 112 effectively translate along or substantially parallel to the tangent line 14 described hereinabove. FIGS. 4A, 5A, and 4D and 5D, and FIGS. 4C, 5C, and 4F and 5F, illustrate the displacement range for substantially in-plane displacements of the aft ends 110, 112 with respect to the engine port wall 154W with respect to the neutral positions of FIGS. 4B, and 5B, and 4E and 5E, respectively, For example, if the aft ends 110, 112 in the upper portion of FIG. 2 experience maximum in-plane displacements to the right as illustrated in FIGS. 4C, 5C (effectively an upward pivoting motion with respect to the duct pivot point 12), the aft ends 110, 112 in the lower portion of FIG. 2 experience maximum in-plane displacements to the left as illustrated in FIGS. 4A, 5A.

A variety of modifications and variations of the present invention are possible in light of the above teachings. It is therefore to be understood that, within the scope of the appended claims, the present invention may be practiced otherwise than as specifically described hereinabove.

What is claimed is:

1. A flexible engine inlet duct mounting system for integrating an engine inlet duct in combination with an engine port of an engine system, the engine inlet duct having aft ends, comprising:

duct support means for controlling the motion of the aft ends of the engine inlet duct with respect to the engine system to substantially in-plane displacements with respect to the walls defining the engine port and about a duct pivot point coincident with the engine system centerline, said duct support means including an annular spherical adaptor member having first and second ends, said first end being rigidly interfaced with the engine system, and an annular duct support member having first and second ends, said first end being rigidly secured in combination with one aft end of the engine inlet duct, said second ends of said annular spherical adaptor member and said annular duct support member being disposed in bearing relationship against one another wherein said end of said annular duct support member is frictionally to cause the substantially in-plane displacements of the aft ends of the engine inlet duct with respect to the walls defining the engine port; and sealing means for accommodating the substantially in-plane displacements of the aft ends of the engine inlet duct and concomitantly maintaining the aft ends in sealed relationship with the walls defining the engine port of the engine system during the substantially in-plane displacements of the aft ends of the engine inlet duct.

2. The flexible engine inlet duct mounting system of claim 1 wherein the engine inlet duct is formed by an outer wall and an inner wall in combination, and wherein said sealing means comprises:

an outer sealing assembly including a spherical sliding seal disposed in sliding combination with the aft end of the outer wall, and an annular V-band clamp, said annular V-band clamp being disposed in combination with said spherical sliding seal and a flange of the corresponding wall of the engine port to mechanically interlock said spherical sliding seal and the flange in combination such that said spherical sliding seal slides relative to the aft end of the outer wall during the substantially in-plane displacements of the aft end of the outer wall.

3. The flexible engine inlet duct mounting system of claim 1 wherein the engine inlet duct is formed by an outer wall and an inner wall in combination, and wherein said sealing means comprises:

a sealing assembly including a labyrinth seal having at least one tooth secured in combination with the aft end of the inner wall so that said at least one tooth abuts against and slides relative to a slip joint of the corresponding wall of the engine port during the substantially in-plane displacements of the aft end of the inner wall.

4. The flexible engine inlet duct mounting system of claim 1 wherein said second end of said annular spherical adaptor member has an arcuate configuration having a predetermined radius of curvature defined with respect to said duct pivot point, and wherein said second end of said annular duct support member has an arcuate configuration complementary to said arcuate configuration of said second end of said annular spherical adaptor member.

5. The flexible engine inlet duct mounting system of claim 1 wherein the engine inlet duct is formed by an outer wall and an inner wall in combination, said duct pivot point being defined by the intersection of the engine system centerline with a first line which is orthogonal to a second line tangent to the aft end of the outer wall and the corresponding wall of the engine port.

6. The flexible engine inlet duct mounting system of claim 1 wherein the engine inlet duct is formed by an outer wall and an inner wall in combination, and wherein said sealing means comprises:

an outer sealing assembly including an annular duct mounting member, an annular resilient sealing member bonded to said annular duct mounting member and the aft end of the outer wall, and an annular V-band clamp, said annular V-band clamp being disposed in combination with said annular duct mounting member and a flange of the corresponding wall of the engine port to mechanically interlock said annular duct mounting member and the flange in combination such that said annular resilient sealing member elastically deforms during the substantially in-plane displacements of the aft end of the outer wall.

7. The flexible engine inlet duct mounting system of claim 6 wherein said annular resilient sealing member comprises:

a plurality of rings of elastomeric material; and
at least one ring of metallic material;

said at least one ring of metallic material being interposed between rings of said elastomeric material.

8. The flexible engine inlet duct mounting system of claim 6 wherein said annular resilient sealing member comprises a ring of elastomeric material.

9. A flexible engine inlet duct mounting system for integrating an engine inlet duct in combination with an engine port of an engine system, the engine inlet duct being formed by outer and inner walls having aft ends, comprising:

an annular spherical adaptor member having first and second ends, said first end being rigidly interfaced with the engine system;

annular duct support member having first and second ends, said first end being rigidly secured in combination with the aft end of the inner wall of the engine inlet duct;

said second ends of said annular spherical adaptor member and said annular duct support member being disposed in bearing relationship against one another wherein said second end of said annular duct support member is frictionally slidable with respect to said second end of said annular spherical adaptor member to cause substantially in-plane displacements of the aft ends of the outer and inner walls of the engine inlet duct with respect to the walls defining the engine port; and sealing means for accommodating the substantially in-plane displacements of the aft ends of the outer and inner walls of the engine inlet duct and concomitantly maintaining the aft ends of the outer and inner walls of the engine inlet duct in sealed relationship with the walls defining the engine port of the engine system during the substantially in-plane displacements of the aft ends of the outer and inner walls of the engine inlet duct.

10. The flexible engine inlet duct mounting system of claim 9 wherein said second end of said annular spherical adaptor member has an arcuate configuration having a predetermined radius of curvature, said predetermined radius of curvature being defined with respect to a duct pivot point coincident with the engine system centerline, and wherein said second end of said annular duct support member has an arcuate configuration complementary to said arcuate configuration of said second end of said annular spherical adaptor member.

11. The flexible engine inlet duct mounting system of claim 9 wherein said sealing means comprises:

an outer sealing assembly including a spherical sliding seal disposed in sliding combination with the aft end of the outer wall, and an annular V-band clamp, said annular V-band clamp being disposed in combination with said spherical sliding seal and a flange of the corresponding wall of the engine port to mechanically interlock said spherical sliding seal and the flange in combination such that said spherical sliding seal slides relative to the aft end of the outer wall during the substantially in-plane displacements of the aft end of the outer wall.

12. The flexible engine inlet duct mounting system of claim 9 wherein said sealing means comprises:

a sealing assembly including a labyrinth seal having at least one tooth secured in combination with the aft end of the inner wall so that said at least one tooth abuts against and slides relative to a slip joint of the corresponding wall of the engine port during the substantially in-plane displacements of the aft end of the inner wall.

13. The flexible engine inlet duct mounting system of claim 10 wherein said sealing means comprises:

an outer sealing assembly including an annular duct mounting member, an annular resilient sealing member bonded to said annular duct mounting member and the aft end of the outer wall, and an annular V-band clamp, said annular V-band clamp being disposed in combination with said annular duct mounting member and a flange of the corresponding wall of the engine port to mechanically interlock said annular duct mounting member and the flange in combination such that said annular resilient sealing member elastically deforms during the substantially in-plane displacements of the aft end of the outer wall.

14. The flexible engine inlet duct mounting system of claim 13 wherein said annular resilient sealing member comprises:

a plurality of rings of elastomeric material; and
at least one ring of metallic material;
said at least one ring of metallic material being interposed between rings of said elastomeric material.

15. The flexible engine inlet duct mounting system of claim 13 wherein said annular resilient sealing member comprises a ring of elastomeric material.

* * * * *